(12) United States Patent
Das

(10) Patent No.: US 11,263,388 B2
(45) Date of Patent: Mar. 1, 2022

(54) METHOD AND SYSTEM FOR DYNAMICALLY GENERATING SUMMARISED CONTENT FOR VISUAL AND CONTEXTUAL TEXT DATA

(71) Applicant: Wipro Limited, Bangalore (IN)

(72) Inventor: Rishav Das, Howrah (IN)

(73) Assignee: Wipro Limited, Bangalore (IN)

(*) Notice: Subject to any disclaimer, the term of this patent is extended or adjusted under 35 U.S.C. 154(b) by 0 days.

(21) Appl. No.: 16/835,074

(22) Filed: Mar. 30, 2020

(65) Prior Publication Data
US 2021/0256203 A1 Aug. 19, 2021

(30) Foreign Application Priority Data
Feb. 17, 2020 (IN) .............................. 202041006741

(51) Int. Cl.
*G06F 17/00* (2019.01)
*G06F 40/151* (2020.01)
*G06N 20/00* (2019.01)
*G06K 9/62* (2022.01)
*G06F 40/284* (2020.01)

(52) U.S. Cl.
CPC .......... *G06F 40/151* (2020.01); *G06F 40/284* (2020.01); *G06K 9/6268* (2013.01); *G06N 20/00* (2019.01)

(58) Field of Classification Search
CPC ......... G06F 17/30604; G06F 17/30572; G06F 17/30598; G06F 17/30616; G06F 40/284; G06F 40/151; G06F 16/313; G06F 16/288; G06F 16/26; G06F 16/285; G06N 20/00; G06K 9/6268

USPC .......................................................... 715/254
See application file for complete search history.

(56) References Cited

U.S. PATENT DOCUMENTS

| | | | |
|---|---|---|---|
| 8,995,758 B1* | 3/2015 | Bissacco ................ | G06Q 30/06 382/159 |
| 9,516,089 B1* | 12/2016 | Ansel ...................... | G06F 16/35 |
| 9,767,165 B1 | 9/2017 | Tacchi et al. | |
| 10,185,708 B2 | 1/2019 | Miller et al. | |
| 2006/0074836 A1* | 4/2006 | Gardner ................... | G06N 5/02 706/60 |
| 2009/0254529 A1* | 10/2009 | Goldentouch ........ | G06F 40/169 |

(Continued)

FOREIGN PATENT DOCUMENTS

| | | |
|---|---|---|
| CN | 104834735 A | 8/2015 |
| EP | 2641401 B1 | 11/2011 |

*Primary Examiner* — Jason T Edwards
(74) *Attorney, Agent, or Firm* — Finnegan, Henderson, Farabow, Garrett & Dunner, LLP

(57) ABSTRACT

A method and data summarization system for dynamically generating summarised content for visual and contextual text data, is disclosed. The method includes classifying plurality of dataset related to one or more domains based on datatype associated with each dataset. The datatype comprises text, numeric and visual data. Upon classification, one or more usable tokens are determined from the text data using a predefined token learning model. Further, one or more graphical parameters are determined from the visual data by using a pre-trained graphical model. Thereafter, based on the one or more usable tokens and the one or more graphical parameters, a summarized content is generated for the plurality of dataset.

14 Claims, 6 Drawing Sheets

(56) References Cited

U.S. PATENT DOCUMENTS

| | | | |
|---|---|---|---|
| 2013/0055075 A1* | 2/2013 | Ruvini | G06F 16/958 |
| | | | 715/255 |
| 2013/0287264 A1* | 10/2013 | Chen | G07D 7/2075 |
| | | | 382/112 |
| 2014/0337719 A1* | 11/2014 | Xu | G06F 40/106 |
| | | | 715/255 |
| 2014/0350965 A1* | 11/2014 | Meystre | G16H 15/00 |
| | | | 705/3 |
| 2015/0296046 A1* | 10/2015 | Adams | H04L 67/06 |
| | | | 715/748 |
| 2017/0371856 A1* | 12/2017 | Can | G06K 9/469 |
| 2019/0005405 A1* | 1/2019 | Zholudev | G06N 20/00 |
| 2020/0042837 A1* | 2/2020 | Skinner | G06F 21/62 |
| 2020/0067861 A1* | 2/2020 | Leddy | H04L 51/12 |
| 2020/0104410 A1* | 4/2020 | Lee | G06F 16/313 |

\* cited by examiner

| FORMAT | RULE | FUNCTION |
|--------|------|----------|
| .CSV | CSV_EXTRACT (DATSET) | SEP(;) |
| .DB | DB_EXTRACT(DATSET) | QUERY (SELECT_DATASET) |
| .BI | BI_EXTRACT(DATSET) | XLSX=SEP(ROW,COL) |

Fig.2b

METHOD AND SYSTEM FOR DYNAMICALLY GENERATING SUMMARISED CONTENT FOR VISUAL AND CONTEXTUAL TEXT DATA

TECHNICAL FIELD

The present subject matter is related in general to data processing systems, more particularly, but not exclusively to method and system for dynamically generating summarised content for visual and contextual text data.

BACKGROUND

Data visualization is a graphical representation of information and data. By using visual elements such as, charts, graphs, and maps, data visualization techniques provide an accessible way to see and understand trends, outliers, and patterns in data. For any kind of data visualization models, hidden feature/patterns are difficult to interpret for a set of users such as, non-programmers, business executive and the like. Generally, there are different set of interpretation that can be made from a particular data visualization unit and actual depth can only be understood by developer or engineer, which becomes difficult for businessperson to derive out.

Conventionally, there are no mechanisms to interpret and resolute such problems without manually feeding the data or need to use fixed method of notation to manage varied dataset. This problem is addressed manually by implementing different techniques based on kind and type of problem. Further, in current systems, most of the summarization models deal with word vectors and featuring most important aspect related to context of the document or dataset. However, summarizing based on reason and meaning is more important for humans to understand the hidden cause and exploration of the dataset as well as problem statement. Typically, the dataset can be any type, be it a problem statement or document, the meaning and exploration of the data is more important and can help in many field to understand and collaborate with human machine interface.

Further, existing systems do not determine hidden features of the data such as univariate selection, feature matrix, correlational analysis, dimensionality of data, seasonality, randomness, variance in the data. Generally, Business Intelligence (BI) tools plot the data based on end user interpretation. Hence, the feature of the dataset remains un-plotted. In addition, these features need to be manually intervened in data visualization platform. This manual intervention needs someone to work on these datasets before determining the type of visualization it can be absorbed or performed.

Further, interpreting different parameters on different graphical model is not being addressed in existing systems. The parameters cannot be parsed to extract the graphical representation overview. Hence, it becomes difficult for end users to derive meaningful insights/summary from the dataset. In addition, the existing systems fail in tracking multiple problematic insights from the dataset, where the dataset needs to be in structured state, which again need more amount of time as well as human resource intervention. This increases the time required to solve the problem and becomes very difficult to provide resolution to the problem.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure may relate to a method for dynamically generating summarised content for visual and contextual text data. The method comprises classifying a plurality of dataset related to one or more domains based on datatype associated with each dataset. The datatype comprises text, numeric and visual data. Upon classification, the one or more usable tokens are determined from the text data by using a predefined token learning model. Further, one or more graphical parameters are determined from the visual data by using a pre-trained graphical model. Thereafter, the method generates a summarized content for the plurality of dataset based on the one or more usable tokens and the one or more graphical parameters.

In an embodiment, the present disclosure may relate to a data summarisation system for dynamically generating summarised content for visual and contextual text data. The data summarisation system may comprise a processor and a memory communicatively coupled to the processor, where the memory stores processor executable instructions, which, on execution, may cause the data summarisation system to classify a plurality of dataset related to one or more domains based on datatype associated with each dataset. The datatype comprises text, numeric and visual data. Upon classification, the data summarisation system determines one or more usable tokens from the text data by using a predefined token learning model. Further, one or more graphical parameters are determined from the visual data by using a pre-trained graphical model. Thereafter, the data summarisation system generates a summarized content for the plurality of dataset based on the one or more usable tokens and the one or more graphical parameters.

In an embodiment, the present disclosure relates to a non-transitory computer readable medium including instructions stored thereon that when processed by at least one processor may cause a data summarisation system to classify a plurality of dataset related to one or more domains based on datatype associated with each dataset. The datatype comprises text, numeric and visual data. Upon classification, the instruction causes the processor to determine one or more usable tokens from the text data by using a predefined token learning model. Further, one or more graphical parameters are determined from the visual data by using a pre-trained graphical model. Thereafter, the instruction causes the processor to generate a summarized content for the plurality of dataset based on the one or more usable tokens and the one or more graphical parameters.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 2b shows an exemplary table for datatype extraction in accordance with some embodiments of the present disclosure;

Figure 1:
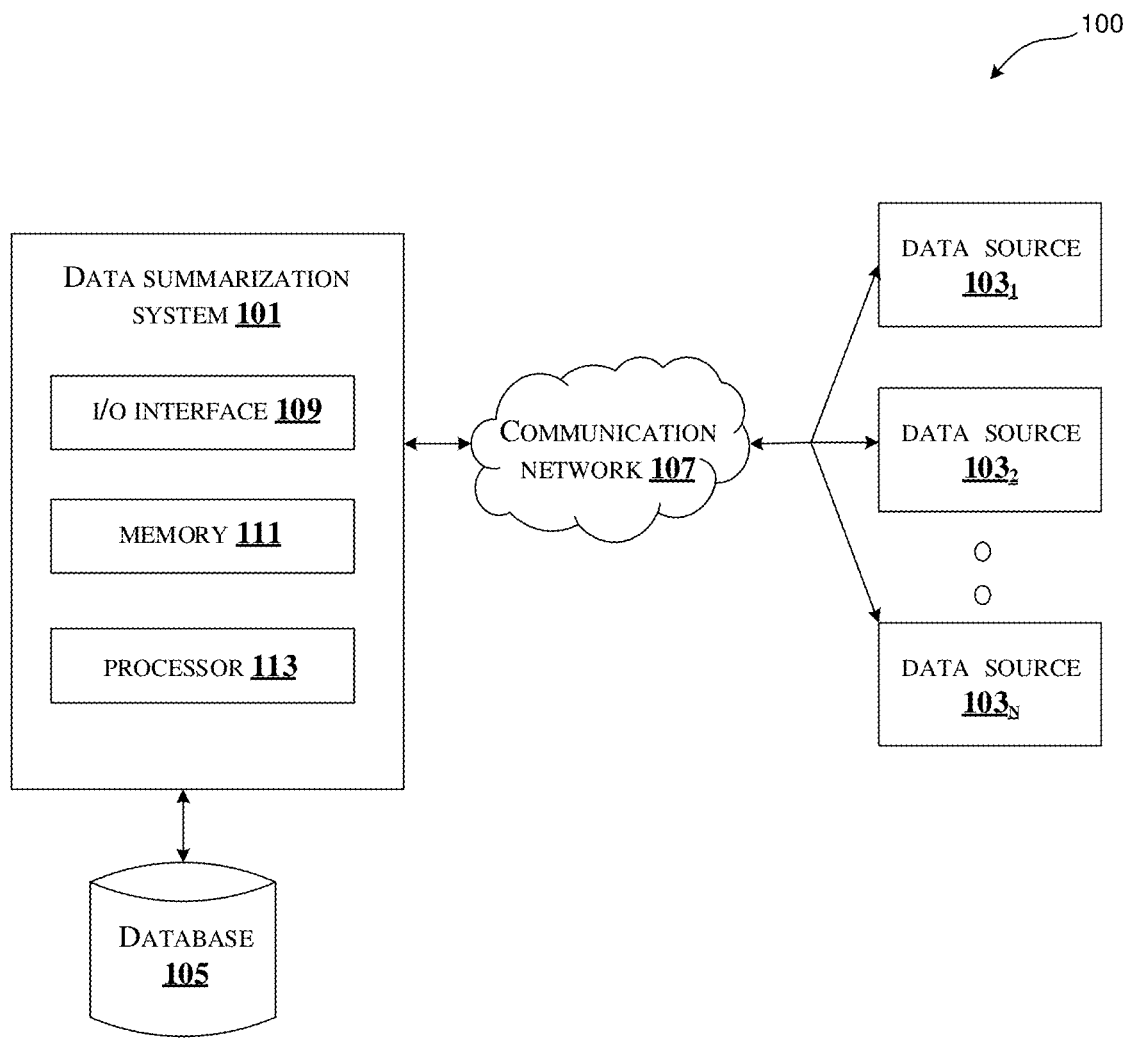
FIG. 1 illustrates an exemplary environment for dynamically generating summarised content for visual and contextual text data in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Embodiments of the present disclosure may relate to a method and data summarisation system for dynamically generating summarised content for visual and contextual text data. The visual data may be for example, images, graphs and the like. Existing systems with data visualization model possess difficulty to interpret hidden features or patterns of data. Sometimes, cause is related to some other reasons and the data is processed to fit in computational models. In such cases, the present disclosure provides a method and system for learning and determining computational connection between graphical data and textual objects associated with plurality of dataset in order to generate a summarized content for the dataset. Thus, the present disclosure provides automated generation of summarised content for visual and contextual data.

FIG. 1 illustrates an exemplary environment for dynamically generating summarised content for visual and contextual text data in accordance with some embodiments of the present disclosure.

As shown in FIG. 1, an environment 100 includes a data summarisation system 101 connected through a communication network 107 to a data source $103_1$, a data source $103_2$, . . . and a data source $103_N$ (collectively referred as data sources 103). The data sources 103 may be associated with an organization and may include, but not limited to, Information Technology Service Management (ITSM) tool, database, data warehouse or any data visualization tools such as power Business Intelligence (BI), tableau and the like. The communication network 107 may include, but is not limited to, a direct interconnection, an e-commerce network, a Peer-to-Peer (P2P) network, Local Area Network (LAN), Wide Area Network (WAN), wireless network (for example, using Wireless Application Protocol), Internet, Wi-Fi and the like. Further, the data summarisation system 101 is connected to a database 105. The database 105 may store plurality of dataset and usable tokens. In an embodiment, the database 105 may be used to connect a set of unstructured dataset by storing addresses of such dataset.

The data summarisation system 101 summarises content from visual and contextual text data. The data summarisation system 101 may include, but is not limited to, a laptop, a desktop computer, a notebook, a smartphone, IOT devices, system, a tablet, a server, and any other computing devices. A person skilled in the art would understand that, any other devices, not mentioned explicitly, may also be used as the data summarisation system 101 in the present disclosure.

Further, the data summarisation system 101 may include an I/O interface 109, a memory 111 and a processor 113. The I/O interface 109 may be configured to receive data from the data sources 103 and the database 105. The data from the I/O interface 109 may be stored in the memory 111. The memory 111 may be communicatively coupled to the processor 113 of the data summarisation system 101. The memory 111 may also store processor instructions which may cause the processor 113 to execute the instructions for dynamically generating summarised content for visual and contextual text data in the data summarisation system 101.

The data summarisation system 101 may receive a plurality of dataset related to one or more domains from the data sources 103. The one or more domains may be for example, finance, engineering, travel, accounts, marketing and the like. In an embodiment, the plurality of dataset may be processed to remove errors. The errors may include, for example, blank data, exploding gradients, vanishing gradients, duplicate data and the like. On receiving the plurality of dataset, the data summarisation system 101 may classify the plurality of dataset based on datatype associated with each dataset. The datatype may include for instance, text, numeric and visual data. The visual data may be for example, images, graphs and the like. Upon classification, the data summarisation system 101 may determine one or more usable tokens from the text data using a predefined token learning model. In an embodiment, the usable token may indicate cause and facts associated with the text data. In an embodiment, the token learning model is a machine learning model, which is trained offline using plurality of usable token identified based on dataset labelled with domain, entity and intent. In an embodiment, the token learning model may learn a relationship among plurality of tokens associated with one or more domains.

Simultaneously, based on classification of visual data, the data summarisation system 101 may determine one or more graphical parameters by using a pre-trained graphical model. In an embodiment, the graphical model is trained using a plurality of historic graphs associated with one or more domains and formulas associated with the historic graphs. In an embodiment, the graphical model may be a machine learning model. In an embodiment, the one or more graphical parameters may be determined by detecting density associated with the one or more graphical parameters. The one or more graphical parameters may include, but not limited to, a color palate used in the visual related data, sensitivity associated with colors and size of graphical plots. A person skilled in the art would understand that any other graphical parameters, not mentioned herein explicitly may also be used in the present disclosure.

Thereafter, the data summarisation system 101 may generate a summary for the plurality of dataset by mapping at least the one or more usable tokens and the one or more graphical parameters associated with the plurality of dataset. In an embodiment, the summary may include details in form of text on the visual data and one or more suggestions and hidden factors associated with the plurality of dataset. In an embodiment, the data summarisation system 101 may identify presence of at least one of false positive and negative values in the one or more usable tokens and graphical parameters, which are eliminated from the plurality of dataset. The false positive values are error in data reporting, such as, discrepancy in label data. In an embodiment, the present disclosure may be implemented as server client model for multi nodal application communication.

Figure 2A:
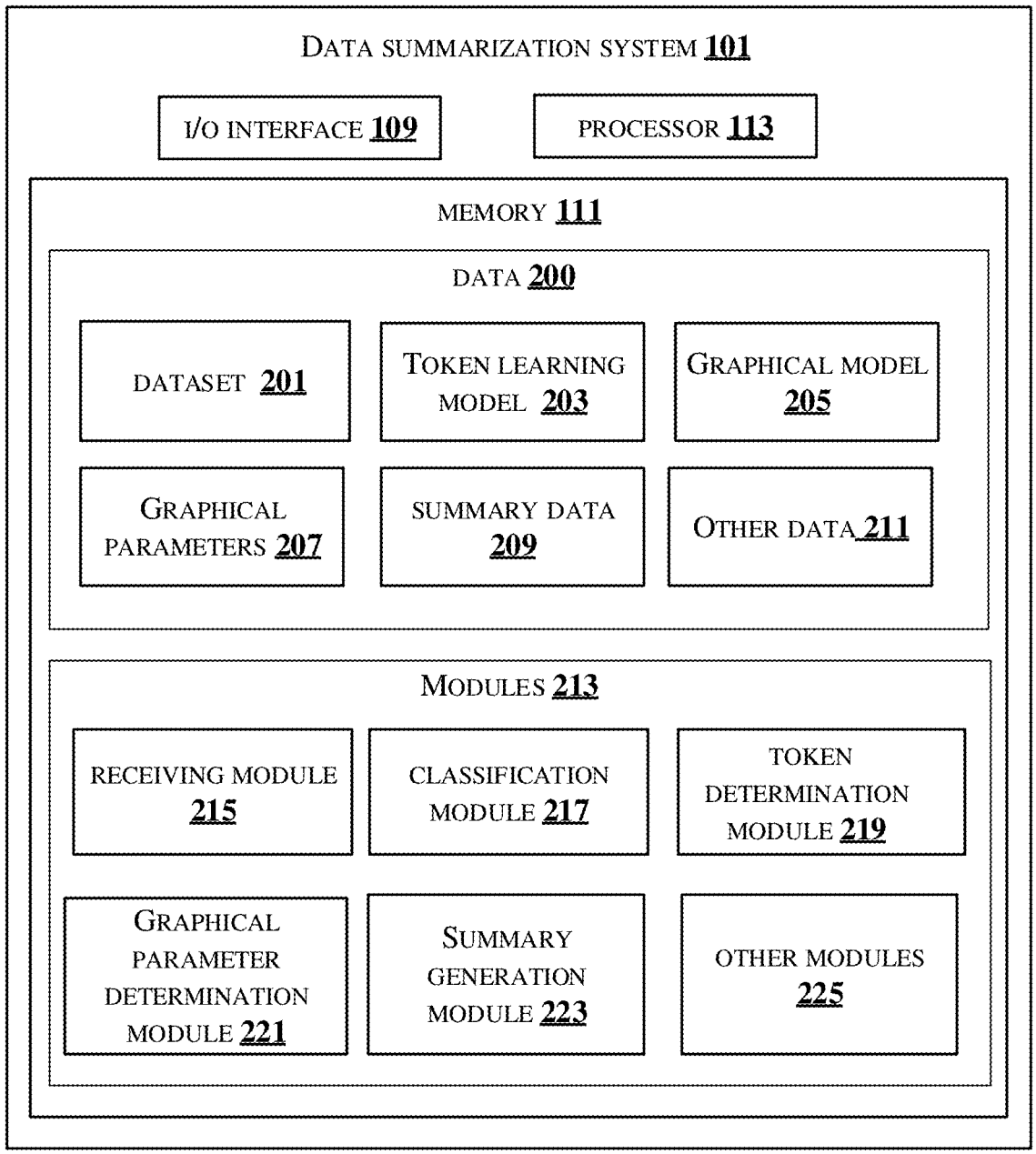
FIG. 2a shows a detailed block diagram of a data summarisation system in accordance with some embodiments of the present disclosure.

FIG. 2a shows a detailed block diagram of a data summarisation system in accordance with some embodiments of the present disclosure.

The data summarisation system 101 may include data 200 and one or more modules 213 which are described herein in detail. In an embodiment, data 200 may be stored within the memory 111. The data 200 may include, for example, dataset 201, token learning model 203, graphical model 205, graphical parameters 207, summary data 209 and other data 211.

The dataset 201 may include the plurality of dataset received from the data sources 103. The plurality of dataset may include, image, sentences, word, string, character, numeric and the like. In an embodiment, the plurality of dataset may be a combination of multiple data types and dataset, which may be grouped from one or more data sources 103. The one or more data sources 103 may include, for example, Information Technology Service Management (ITSM) tool, database, data warehouse or any data visualization tools such as power Business Intelligence (BI), Tableau™ and the like.

The token learning model 203 is a pre-trained model for determining the one or more usable tokens from the contextual text data of the plurality of dataset. The token learning model 203 may be the machine learning model, which is trained based on the plurality of usable tokens identified based on dataset labelled by domain experts with domain, entity and intent.

The graphical model 205 is the predefined model for determining the one or more graphical parameters from the visual data of the plurality of the dataset. The graphical model 205 may be the machine learning model, which is trained based on the plurality of historic graphs associated with one or more domains and formulas associated with the historic graphs.

The graphical parameters 207 may include the one or more graphical parameters determined from current visual data. The one or more graphical parameters may include for example, color palate used in the visual related data, sensitivity associated with colors, size of graphical plots and the like.

The summary data 209 may include the summary generated for the plurality of dataset. Further, the summary data 209 may include the one or more suggestions and hidden factors associated with the plurality of dataset.

The other data 211 may store data, including temporary data and temporary files, generated by modules 213 for performing the various functions of the data summarisation system 101.

In an embodiment, the data 200 in the memory 111 are processed by the one or more modules 213 present within the memory 111 of the data summarisation system 101. In an embodiment, the one or more modules 213 may be implemented as dedicated units. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. In some implementations, the one or more modules 213 may be communicatively coupled to the processor 113 for performing one or more functions of the data summarisation system 101. The said modules 213 when configured with the functionality defined in the present disclosure will result in a novel hardware.

In one implementation, the one or more modules 213 may include, but are not limited to a receiving module 215, a classification module 217, a token determination module 219, a graphical parameter determination module 221 and a summary generation module 223. The one or more modules 213 may also include other modules 225 to perform various miscellaneous functionalities of the data summarisation system 101. In an embodiment, the other modules 225 may include a training module and a format extracting module. The training module may train the token learning model using the plurality of usable token identified based on dataset labelled with domain, entity and intent and the graphical model using plurality of historic graphs. In an embodiment, the token learning model may be trained using LSTM technique. In an embodiment, the LSTM neural network may include three layers of input (such as, input gate layer, forget layer, output layer). The output layer may be managed for determining the type of input. The LSTM input layer takes past values and calculates necessity of the current input value. This is performed by taking the previous output of neurons and hidden layer and current input and hidden layer and derived from the below equation 1.

$$Val\text{-}1 = sigmoid(Wal[Ht\text{-}1, Xt] + Val) \tag{1}$$

Further, old or past cell state are updated to perform a forget action based on below equation (2).

$$Val\text{-}2 = sigmoid(Wval2[Ht\text{-}1, Xt] + Bval2) \tag{2}$$

$$Candidate\_input = tanh(Wcan[Ht\text{-}1, Xt] + Bcan)$$

Forget operation is performed by multiplier and updating the old cell is performed by the adder as:

$$New\_candidate = Val\text{-}1 * Ct\text{-}1(previous\ cell\ state) + Val\text{-}2 * Candidate\_input(Ct) \tag{3}$$

Further, the output layer may be based on the cell state and represented below equations.

$$Output\_val = sigmoid(Woutput[Ht\text{-}1, Xt] + Boutput) \tag{4}$$

$$Hidden\ Layer = Output\_val * tanh(New\ candidate) \tag{5}$$

Again, in the next neuron, used as past input and past hidden layer.
where, Wcan: Weight of the neurons
Ht-1: Hidden Layer of the neurons
Ct-1=previous cell output
Ct=current cell output
Xt=current cell input
Bxx=bias
The format extracting module may extract format of each dataset based on defined hash mapping table as shown in FIG. 2b.

The receiving module 215 may receive the plurality of dataset from the data sources 103 for generating the summarised content. The plurality of dataset may be related to the one or more domains and may include text, numeric and visual data.

The classification module 217 may classify the plurality of dataset based on the datatype associated with each dataset. In an embodiment, the classification module 217 may check the datatype depending on the format of data in each dataset. For example, the classification module 217 may classify each dataset as text data, numeric data and visual data such as images, graphs and the like. Upon classification, the classification module 217 may transmit the text data to the token determination module 219 and visual data to the graphical parameter determination module 221. The communication can be performed using plurality of network protocols and storage protocols.

The token determination module 219 may determine the one or more usable tokens from the text data received from the classification module 217. The token determination module 219 determines the one or more tokens by using the token learning model 203. The token determination module 219 may use Natural Language Processing (NLP) technique for determining the one or more tokens. The token determination module 219 may use computational machine-learning techniques such as tokenization, Parts of Speech (POS) tagging and the like to determine the one or more usable tokens. In an embodiment, the token determination module 219 may determine an urgency, sentiment, semantic form in a sentence of the text data, which may be used to tune weights in token learning model 203 for taking decisions along with understanding possibilities from hidden exploration of the dataset. In an embodiment, the token determination module 219 may process numeric data by using probabilistic models. The probabilistic model may determine a range by taking a first number of a sequence and a last number of the sequence. In an embodiment, the probabilistic model may check the sequence and a quartile for other parameters based on the sequence parameter.

The token determination module 219 may initially determine word vectors for the one or more tokens identified from the contextual text data. Post vectorization of the tokens, the token determination module 219 determines the one or more usable tokens, which are meaningful and create impact in overall document or dataset. The token determination module 219 may use logarithmic function for determining the one or more usable tokens. In an embodiment, using the logarithmic function may include identifying frequent words and a term frequency from the text data. The term frequency is calculated as per equation 1.

$$TF = (Number\ of\ the\ listed\ token\ fetched\ in\ text\ data)/(Total\ number\ of\ tokens\ in\ the\ text\ data) \tag{1}$$

Further, the token determination module 219 may determine an inverse frequency over the term frequency. Calculation of the inverse frequency is represented by equation (2).

$$IF = Log(Total\ number\ token\ in\ the\ text\ data)/(Number\ of\ listed\ token\ fetched\ in\ the\ text\ data) \tag{2}$$

Thus, the one or more usable tokens are calculated as product of the term frequency and the inverse frequency.

Figure 3A:
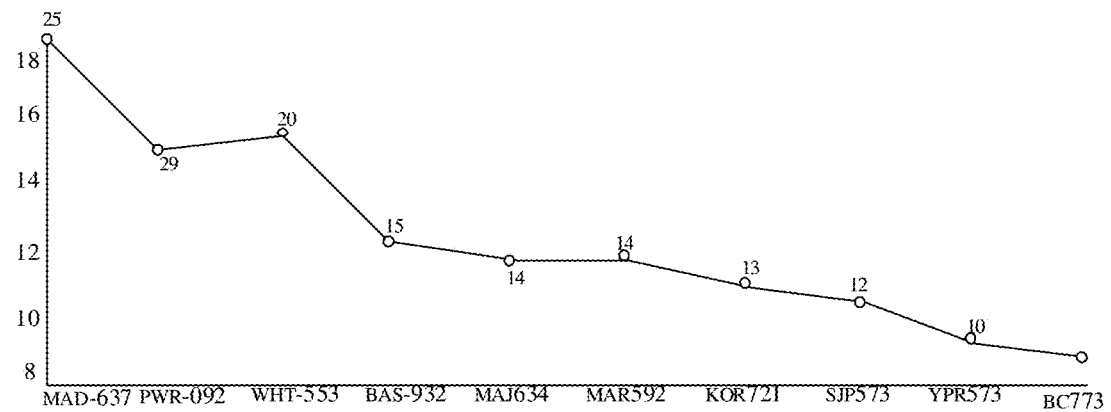
FIG. 3a-FIG. 3b shows an exemplary embodiment for generating summarised content for a graphical data in accordance with some embodiments of the present disclosure.
Figure 3B:
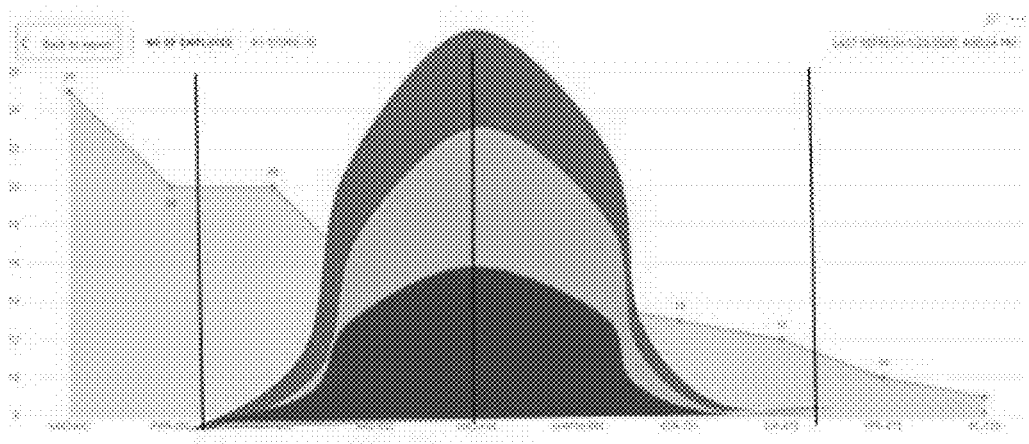

The graphical parameter determination module 221 may determine the one or more graphical parameters from the visual data received from the classification module 217. The graphical parameter determination module 221 determines the one or more graphical parameters by using the graphical model 205. The graphical model is trained with graphical formulas as well as other factors such as, quadrants, naming conventions, etc. In an embodiment, the graphical parameter determination module 221 may interpret graphical functions such as, boxplot, histogram, cluster, scatterplot and the like and determine dimensions of such plots (such as x-y-axis). The graphical parameter determination module 221 determines the one or more graphical parameters as, color palate used in the visual related data, sensitivity associated with colors and size of graphical plots. Further, the graphical parameter determination module 221 may detect density associated with the one or more graphical parameters. FIG. 3a-3b shows an exemplary embodiment for generating summarized content for a graphical data in accordance with some embodiments of the present disclosure.

The summary generation module 223 may generate the summary for the plurality of dataset by mapping the one or more usable tokens and the one or more graphical parameters associated with the plurality of dataset. In an embodiment, the mapping may be performed using statistical learning technique, wherein a category is classified based on observation from output from token determination module 219 and graphical parameter determination module 221. Alternatively, the mapping may be performed using a clustering technique, wherein the category is determined based on either the one or more usable tokens or the one or more graphical parameters. For example, "X" axis represents sales and "Y" axis represents year, and statement is sales has increased with decrease in price. In such case, the X axis in the graphical images may be mapped and aligned with sales keyword in the statement and year may be aligned with Y axis as given in the image object. Further, the X axis and Y axis datapoints may be detected. Further, the summary generation module 223 may use topic modelling and cluster algorithm to map similar category of data with derived features.

Figure 4:
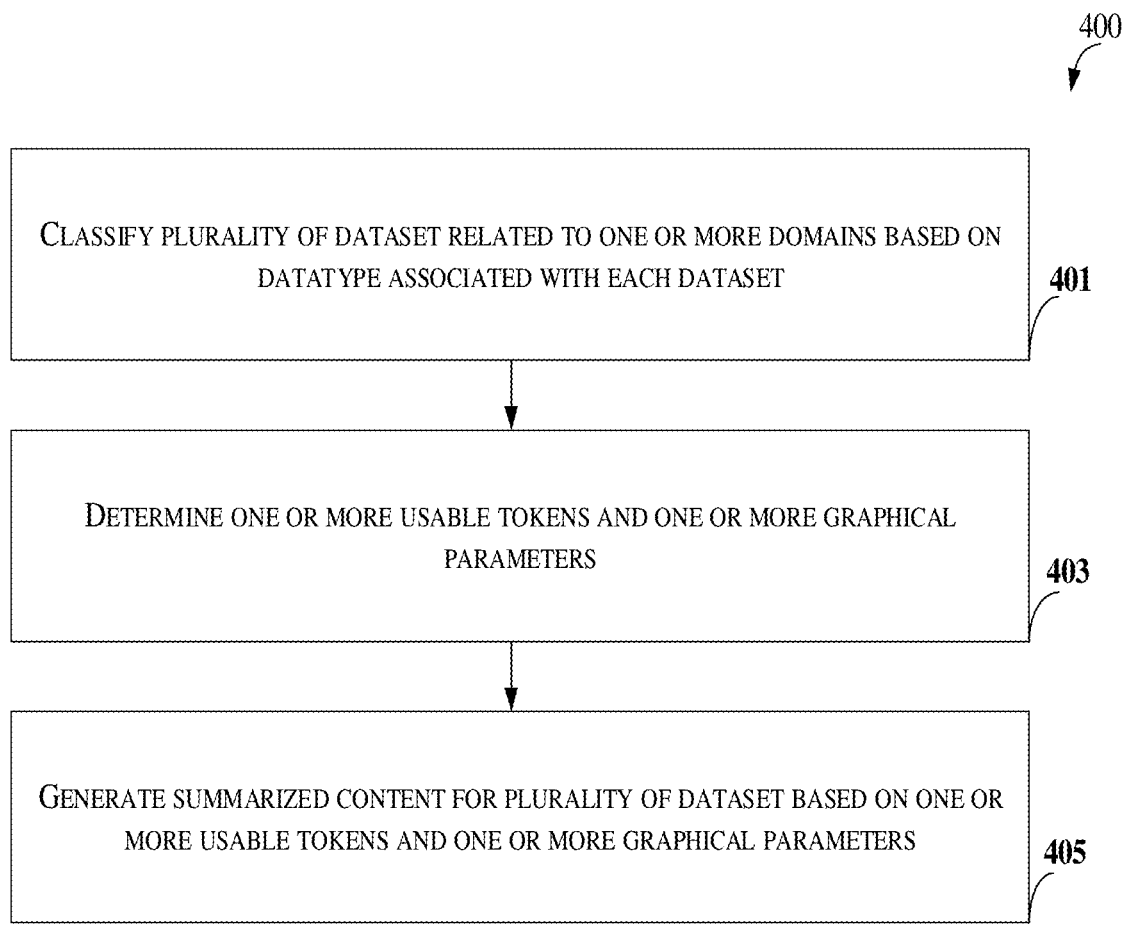
FIG. 4 illustrates a flowchart showing a method for generating summarised content for visual and contextual text data in accordance with some embodiments of present disclosure.

FIG. 4 illustrates a flowchart showing a method for dynamically generating summarized content for visual and contextual text data in accordance with some embodiments of present disclosure.

As illustrated in FIG. 4, the method 400 includes one or more blocks for dynamically generating summarised content for visual and contextual text data. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 401, the plurality of dataset related to one or more domains is classified by the classification module 217 based on the datatype associated with each dataset. In an embodiment, the datatype may be text, numeric and visual data.

At block 403, the one or more usable tokens are determined by the token determination module 219 from the text data by using the predefined token learning model. Simultaneously, the one or more graphical parameters are determined by the graphical parameter determination module 221 from the visual data by using the pre-trained graphical model.

At block 405, the summarized content is generated by the summary generation module 223 for the plurality of dataset based on the one or more usable tokens and the one or more graphical parameters.

Figure 5:
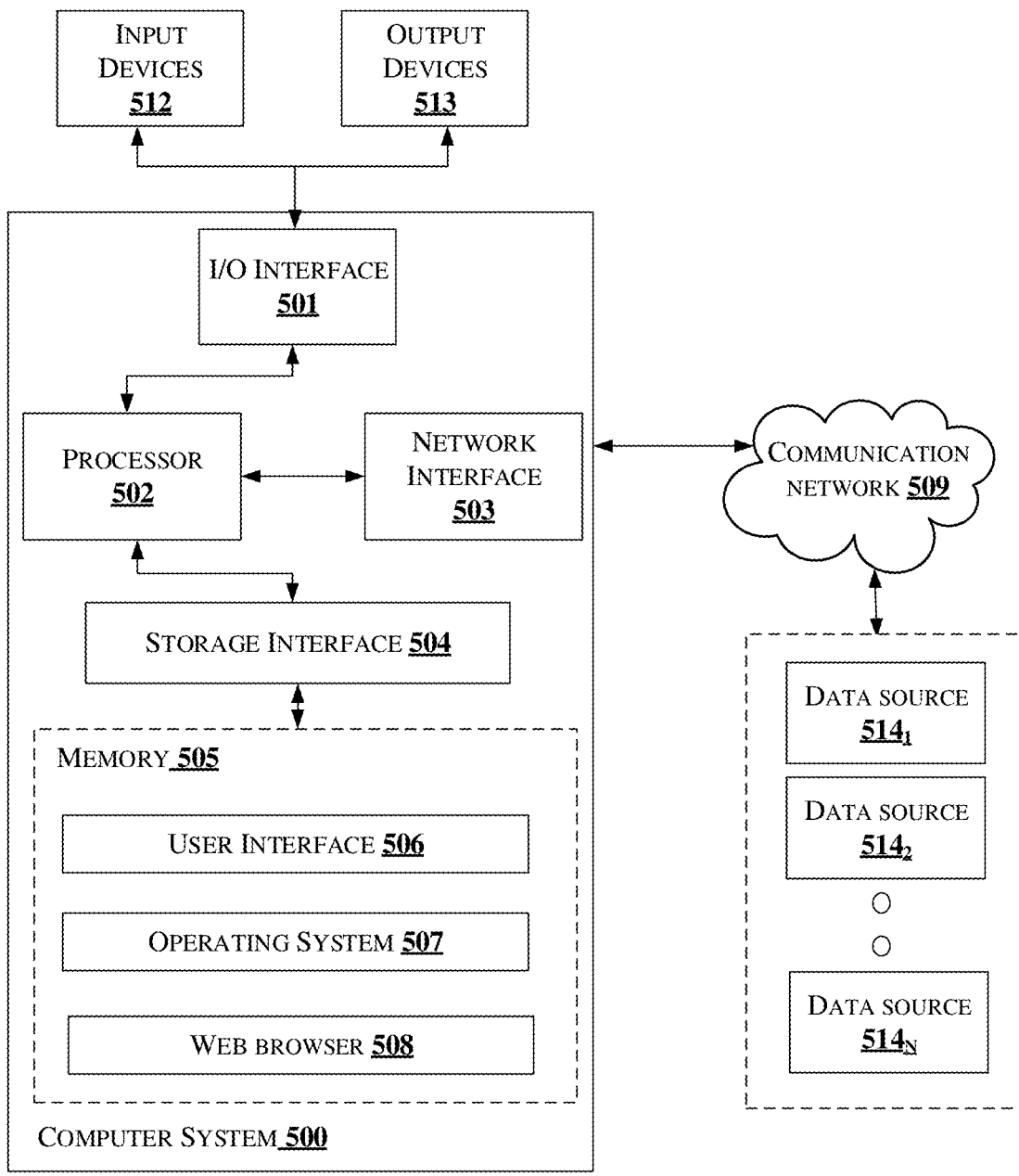
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 may be used to implement the data summarisation system 101. The computer system 500 may include a central processing unit ("CPU" or "processor") 502. The processor 502 may include at least one data processor for dynamically generating summarised content for visual and contextual text data. The processor 502 may include specialized processing units such as, integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices such as input devices 512 and output devices 513. For example, the input devices 512 may be an antenna, keyboard, mouse, joystick, (infrared) remote control, camera, card reader, fax machine, dongle, biometric reader, microphone, touch screen, touch-pad, trackball, stylus, scanner, storage device, transceiver, video device/source, etc. The output devices 613 may be a printer, fax machine, video display (e.g., Cathode Ray Tube (CRT), Liquid Crystal Display (LCD), Light-Emitting Diode (LED), plasma, Plasma Display Panel (PDP), Organic Light-Emitting Diode display (OLED) or the like), audio speaker, etc.

In some embodiments, the computer system 500 consists of the data summarisation system 101. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 509 may include, without limitation, a direct interconnection, local area network (LAN), wide area network (WAN), wireless network (e.g., using Wireless Application Protocol), the Internet, etc. Using the network interface 503 and the communication network 509, the computer system 500 may communicate with user devices 514. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 509 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507 etc. In some embodiments, computer system 500 may store user/application data, such as, the data, variables, records, etc., as described in this disclosure. Such databases may be implemented as fault-tolerant, relational, scalable, secure databases such as Oracle or Sybase.

The operating system 507 may facilitate resource management and operation of the computer system 500.

Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 500 may implement a web browser 508 stored program component. The web browser 508 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX™, DHTML™, ADOBE® FLASH™, JAVASCRIPT™, JAVA™, Application Programming Interfaces (APIs), etc. In some embodiments, the computer system 500 may implement a mail server stored program component. The mail server may be an Internet mail server such as Microsoft Exchange, or the like. The mail server may utilize facilities such as ASP™, ACTIVEX™, ANSI™ C++/C#, MICROSOFT®, .NET™, CGI SCRIPTS™, JAVA™, JAVASCRIPT™, PERL™, PHP™ PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 500 may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure facilitates automated detection of the graphical and computational representation.

An embodiment of the present disclosure provides automated summarization of the dataset.

An embodiment of the present disclosure helps in interpreting different data type together and create a connection between different dataset.

An embodiment of the present disclosure eliminates manual bisection during determination of the state of the dataset.

An embodiment of the present disclosure helps in exploring huge amount of dataset.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fiber, copper wire, etc. The transmission signals in which the code or logic is encoded may further include a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| Referral numerals: | |
|---|---|
| Reference Number | Description |
| 100 | Environment |
| 101 | Data summarisation system |
| 103 | Data sources |
| 105 | Database |
| 107 | Communication network |
| 109 | I/O interface |
| 111 | Memory |
| 113 | Processor |
| 200 | Data |
| 201 | Dataset |
| 203 | Token learning model |
| 205 | Graphical model |
| 207 | Graphical parameters |
| 209 | Summary data |
| 211 | Other data |
| 213 | Modules |
| 215 | Receiving module |
| 217 | Classification module |
| 219 | Token determination module |
| 221 | Graphical parameter determination module |
| 223 | Summary generation module |
| 225 | Other modules |

What is claimed is:

1. A method for dynamically generating summarised content for graphical plots and contextual text data in a document, the method comprising:
classifying, by the data summarisation system, a plurality of dataset related to one or more domains based on datatype associated with each dataset in the document, wherein the datatype comprises text, numeric and graphical plots, and
wherein the numeric datatype is processed based on probabilistic models that determine a range by taking a first number of a sequence and a last number of the sequence, and
wherein the probabilistic models check the sequence and a quartile for other parameters based on a sequence parameter;
determining, by the data summarisation system, upon classification, one or more usable tokens from the text data by using a pretrained token learning model, and one or more graphical parameters from the graphical plots by using a pre-trained graphical model,
wherein the graphical model is trained using a plurality of historic graphs associated with one or more domains and graphical-formulas associated with the plurality of historic graphs, so as to determine graphical function, univariate selection, feature matrix, correlational analysis, dimensionality, seasonality, randomness, and variance of graphical data,
wherein the one or more graphical parameters comprises color palate used in the graphical plots, sensitivity associated with colors and size of the graphical plots in the document; and
wherein the one or more usable tokens are associated with an urgency, sentiment, and semantic form in the text data of the document; and
generating, by the data summarisation system, a summarized content for the plurality of dataset by mapping the one or more usable tokens and the one or more graphical parameters associated with the plurality of dataset,
wherein the summarized content comprises one or more suggestions and hidden factors indicative of meaningful insights associated with the plurality of dataset in the document.

2. The method as claimed in claim 1, wherein the token learning model is trained using a plurality of usable token identified based on dataset labelled with domain, entity and intent.

3. The method as claimed in claim 1, wherein the classified plurality of dataset is routed to one or more modules for determining the one or more usable tokens and the one or more graphical parameter.

4. The method as claimed in claim 1, wherein determining the one or more graphical parameters comprises detecting density associated with the one or more graphical parameters.

5. The method as claimed in claim 1 further comprising identifying presence of at least one of false positive and negative values in the one or more usable tokens and graphical parameters, wherein the at least one of false positive and negative values are eliminated from the plurality of dataset.

6. The method as claimed in claim 1 further comprising learning a relationship among a plurality of tokens associated with one or more domains.

7. A data summarisation system for generating summarised content for graphical plots and contextual text data in a document, comprising:
a processor; and
a memory communicatively coupled to the processor, wherein the memory stores processor instructions, which, on execution, causes the processor to:
classify a plurality of dataset related to one or more domains based on datatype associated with each dataset in the document, wherein the datatype comprises text, numeric and graphical plots, and wherein the numeric datatype is processed based on probabilistic models that determine a range by taking a first number of a sequence and a last number of the sequence, and wherein the probabilistic models check the sequence and a quartile for other parameters based on a sequence parameter;

determine upon classification, one or more usable tokens from the text data by using a pretrained token learning model, and one or more graphical parameters from the graphical plots by using a pre-trained graphical model, wherein the graphical model is trained using a plurality of historic graphs associated with one or more domains and graphical-formulas associated with the plurality of historic graphs, so as to determine graphical function, univariate selection, feature matrix, correlational analysis, dimensionality, seasonality, randomness, and variance of graphical data, wherein the one or more graphical parameters comprises color palate used in the graphical plots, sensitivity associated with colors and size of the graphical plots in the document; and wherein the one or more usable tokens are associated with an urgency, sentiment, and semantic form in the text data of the document; and generate a summarized content for the plurality of dataset by mapping the one or more usable tokens and the one or more graphical parameters associated with the plurality of dataset, wherein the summarized content comprises one or more suggestions and hidden factors indicative of meaningful insights associated with the plurality of dataset in the document.

8. The data summarisation system as claimed in claim 7, wherein the processor trains the token learning model using a plurality of token identified based on dataset labelled with domain, entity and intent.

9. The data summarisation system as claimed in claim 7, wherein the processor routes the classified plurality of dataset to one or more modules for determining the one or more usable tokens and the one or more graphical parameter.

10. The data summarisation system as claimed in claim 7, wherein the processor determines the one or more graphical parameters by detecting density associated with the one or more graphical parameters.

11. The data summarisation system as claimed in claim 7, wherein the processor identifies the presence of at least one of false positive and negative values in the one or more usable tokens and graphical parameters, wherein the at least one of false positive and negative values are eliminated from the dataset.

12. The data summarisation system as claimed in claim 7, wherein the processor learns a relationship among a plurality of tokens associated with one or more domains.

13. A non-transitory computer readable medium including instruction stored thereon for dynamically generating summarised content for graphical plots and contextual text data in a document that when processed by at least one processor cause a data summarisation system to perform operation comprising:

classifying a plurality of dataset related to one or more domains based on datatype associated with each dataset in the document, wherein the datatype comprises text, numeric and graphical plots, and wherein the numeric datatype is processed based on probabilistic models that determine a range by taking a first number of a sequence and a last number of the sequence, and wherein the probabilistic models check the sequence and a quartile for other parameters based on a sequence parameter;

determining upon classification, one or more usable tokens from the text data by using a pretrained token learning model, and one or more graphical parameters from the graphical plots by using a pre-trained graphical model, wherein the graphical model is trained using a plurality of historic graphs associated with one or more domains and graphical-formulas associated with the plurality of historic graphs, so as to determine graphical function, univariate selection, feature matrix, correlational analysis, dimensionality, seasonality, randomness, and variance of graphical data, wherein the one or more graphical parameters comprises color palate used in the graphical plots, sensitivity associated with colors and size of the graphical plots in the document; and wherein the one or more usable tokens are associated with an urgency, sentiment, and semantic form in the text data of the document; and generating a summarized content for the plurality of dataset by mapping the one or more usable tokens and the one or more graphical parameters associated with the plurality of dataset, wherein the summarized content comprises one or more suggestions and hidden factors indicative of meaningful insights associated with the plurality of dataset in the document.

14. The medium as claimed in claim 13, wherein the token learning model is trained using a plurality of usable token identified based on dataset labelled with domain, entity and intent.

* * * * *